United States Patent
Beckmann et al.

(10) Patent No.: US 6,591,879 B1
(45) Date of Patent: Jul. 15, 2003

(54) VEHICLE TIRE COMPOSITION AND METHOD FOR DISSIPATING HEAT FROM VEHICLE TIRE

(75) Inventors: Otto Beckmann, Hannover (DE); Helmut Kreuser, Magnee (BE); Andreas Topp, Hannover (DE); Axel Becker, Burgwedel (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/512,305

(22) Filed: Feb. 24, 2000

(30) Foreign Application Priority Data

Feb. 25, 1999 (DE) .......................... 199 08 122
Nov. 24, 1999 (EP) ............................ 99123387

(51) Int. Cl.⁷ ..................... B29D 30/06; B29D 30/70; B60C 1/00; B60C 9/18
(52) U.S. Cl. .................. 152/153; 152/532; 152/537; 156/110.1
(58) Field of Search ................. 152/532, 537, 152/153, 564; 156/110.1

(56) References Cited

U.S. PATENT DOCUMENTS 3,253,635 A * 5/1966 Travers
3,481,385 A * 12/1969 Depmeyer et al. .......... 152/537
3,598,165 A * 8/1971 Hanus ....................... 152/532

(List continued on next page.)

FOREIGN PATENT DOCUMENTS

| CA | 956558 | 10/1974 |
| DE | 1755301 | 8/1971 |
| DE | 2208332 | 9/1972 |

(List continued on next page.)

OTHER PUBLICATIONS

Abstract for German 1755301.*
Blow, Rubber Technology and Manufacture, pp. 194, 349–371, 1971.*
English language abstract of German application No. 19652893.
English language abstract of Canadian Application No. 956,558.

Primary Examiner—Steven D. Maki
(74) Attorney, Agent, or Firm—Greenblum & Bernstein, P.L.C.

(57) ABSTRACT

A vehicle tire and a method for dissipating heat from a vehicle tire where the tire has sidewalls, an uppermost area over the sidewalls, a bead area and an inner layer, the inner layer being impermeable to air, a rubberized reinforcement-containing carcass, the carcass extending from the uppermost area of the vehicle tire over the sidewalls into the bead area and being anchored in the bead area by looping around bead cores that are resistant to extension, a rubber tread having one or more tread grooves located radially outside, the tread groove having a base and a groove flank, a belt reinforcement with at least one stabilizer belt located between the rubber tread and the carcass, the stabilizer belt containing rubberized reinforcement, a first rubber composition having a first thermal conductivity, and a second rubber composition having a second thermal conductivity at least about 5% greater than the first thermal conductivity of the first rubber composition, the second rubber composition being arranged in the vicinity of the base of the tread groove and adjacent the groove flank of at least one tread groove, the second rubber composition substantially filling up the space between the base of the tread groove and an outside ply of the belt reinforcement, the second rubber composition not being in contact with a road surface when the tire is new; and/or the second rubber composition being arranged in the area of at least one shoulder of the tire and being connected at least partially with the belt reinforcement that is located beneath the tread, the second rubber composition not coming into contact with a road surface and extending in the axial direction.

71 Claims, 2 Drawing Sheets

U.S. PATENT DOCUMENTS

| | | | |
|---|---|---|---|
| 3,865,169 A | | 2/1975 | Tsuruta |
| 4,152,186 A | * | 5/1979 | Shibata |
| 4,362,200 A | * | 12/1982 | Standley ............... 152/532 |
| 4,425,953 A | * | 1/1984 | Rohde et al. ............ 152/532 |
| 4,517,336 A | * | 5/1985 | Wolff et al. ............ 156/110.1 |
| 5,360,047 A | * | 11/1994 | Fujiwara |
| 5,843,249 A | * | 12/1998 | Ryba et al. |
| 6,247,512 B1 | * | 6/2001 | Radulescu |

FOREIGN PATENT DOCUMENTS

| | | | | |
|---|---|---|---|---|
| DE | 2256826 | | 5/1973 | |
| DE | 19652893 | | 6/1998 | |
| EP | 0209125 | | 1/1987 | |
| EP | 0232242 | | 8/1987 | |
| GB | 1385704 | | 2/1975 | |
| JP | 55-164509 | * | 12/1980 | |
| JP | 63-130407 | * | 6/1988 | |
| JP | 3-42303 | * | 2/1991 | ............... 152/532 |
| JP | 10-217718 | * | 8/1998 | |

* cited by examiner

VEHICLE TIRE COMPOSITION AND METHOD FOR DISSIPATING HEAT FROM VEHICLE TIRE

CROSS-REFERENCE TO RELATED APPLICATIONS

The present application claims priority under 35 U.S.C. § 119 of German Patent Application No. 199 08 122.0, filed on Feb. 25, 1999 and European Patent Application No. 99123387.5, filed on Nov. 24, 1999, the disclosures of which are expressly incorporated by reference herein in their entirety.

BACKGROUND OF THE INVENTION

1. Field of the Invention

The present invention relates to a vehicle tire having at least one inner layer that is impermeable to air, a rubberized reinforcement-containing carcass, which carcass extends from the uppermost area of the vehicle tire over the sidewalls into the bead area and is anchored there by looping around bead cores that are resistant to extension, a rubber tread having tread grooves located radially outside, a belt reinforcement with at least one stabilizer belt located between the rubber tread and the carcass, which stabilizer belt contains rubberized reinforcement, and other common components of vehicle tires such as bands.

2. Discussion of Background Information

Rubber compositions for the tread of conventional vehicle tires are especially tailored to provide optimal handling characteristics, such as rolling resistance and wet skid resistance. In general, rubber compositions, which provide optimal handling characteristics, show evidence of poor thermal conductivity, i.e., during tire use, the thermal energy generated by centrifugal forces and flexing forces is very poorly distributed and dissipated into the environment. Consequently, a build-up of heat in the tires results, thus impairing tire durability. It is known to one skilled in the art that using mixed compositions containing silica and silane reduces heat build-up. However, rubber compositions containing silica and silane possess even worse thermal conductivity than conventional compositions containing carbon black as a filler.

The temperature increases in partial areas of the tire caused by the flexing forces and the centrifugal force are not only related to the magnitude of these forces, but are also related to the thickness of the tire area and the variability in rigidity of the adjacent areas. For example, strong flexing forces occur in the bead and sidewall areas in coordination with the rim, and these forces are in turn intensified by the different rigidities of the materials (carcass, wrapping, etc.) used in the bead and sidewall area. Due to poor heat dissipation at the belt reinforcement, especially at the edges of the belt, the increase in temperature is especially strong. The belt reinforcement is constructed of the actual stabilizer belts and, optionally, tire plies being arranged radially outwards therefrom. The stabilizer belts normally include at least two plies of rubberized, metallic reinforcement, the individual cords of different plies being crossed with respect to one another. In commercial vehicle tires, at least three plies are normally arranged crossing over one another. The metallic reinforcement itself has very high thermal conductivity, which is common for metals. However, it is also possible to employ belt packages of one or more stabilizer belts made of different fabric types, such as aramide fabric. Due to the different rigidities of steel wire or aramide cord and the rubber, particularly strong forces occur in the area of the belt reinforcement, particularly the belt edges. Even if rubber compositions with a high tensile values are used in the belt area, as is known in the prior art, the deformation path and the forces associated therewith are influenced thereby only to a minor extent. The great build-up of heat may cause loosening of the belt edges, thus reducing the capability for retreading, or may cause the separation of the belt edges, thereby completely destroying the tire. Frequently, this type of tire damage may be observed with commercial vehicles such as trucks, busses, wheel loaders, etc., due to their especially high mileage and the effect of the strong forces acting upon these tires. The effects described above may also occur with other vehicles. Various attempts to counteract the problem of the separation of belt edges and to improve the durability of tires by controlling the temperature in tires, especially in the belt edge area, have been made.

U.S. Pat. No. 3,865,169 teaches the possibility of dissipating thermal energy generated in tires with cooling fins placed in a rim having good thermal conductivity, which rim is exposed to the atmosphere. Thus it is necessary for highly thermoconductive wires, networks or bands, such as metal wires, that are in direct contact with the rim to be present throughout the entire tire in order to ensure the thermal conduction to the outside of the tire. This design is very expensive and the patent does not indicate what changes in tire properties result from the introduction of the wires. However, one skilled in the art is aware that wires in the sidewall area have a negative effect on many tire properties, such as suspension, which would adversely affect the comfort of the occupants of the vehicle.

Published German Patent Application No. 1755301 teaches that the temperature build-up in vehicle tires, particularly in treads, may be reduced where the vehicle tire contains graphite homogeneously incorporated in the tire rubber, particularly in the tire tread. Thus, formerly common bias ply tires having a tire tread, which is manufactured in its entirety with a rubber composition containing graphite, have improved thermal conductivity, thus making possible the decrease of temperature in the shoulder of the tread and diminishing the danger of tread separation. However, the result of adding graphite to rubber compositions which are used especially for treads is that the properties of the vulcanized compositions change and no longer satisfy the requirements for today's high-performance tires, i.e., radial ply tires, especially with respect to optimal handling characteristics and tire properties, such as wet skid resistance, dry skid resistance, rolling resistance and wear. Furthermore, adding graphite to the rubber compositions affects the tires, since the lubricating properties of the graphite cannot be suppressed fully even if it is homogeneously distributed.

Published German Patent Application No. 196 52 893 A1 teaches another way of reducing the heat build-up and thus the temperature in the area of the belt edges, without producing serious disadvantages in terms of the tire properties. Each belt edge profile is arranged between two stabilizer belts, the belt edge profile being composed of a rubber composition whose Shore hardness is 60 to 95% of the rubber composition used for the stabilizer belts and whose rebound elasticity (at 70° C.) is $\geq 60\%$. The lower heat build-up in the areas of the belt edges is attributed to the fact that the occurring forced deformations are displaced largely into the soft, highly elastic belt edge profile. The thermal energy being generated, however, is not dissipated, but rather its point of origin is only partially displaced.

SUMMARY OF THE INVENTION

The present invention concerns the production of a vehicle tire wherein the temperature of the rubber compositions in the areas near the belt may be effectively reduced using suitable measures, thereby improving the durability and service life of the tire without sacrificing desired handling characteristics.

The present invention also concerns a rubber composition being arranged substantially in the direct vicinity of the tread groove base and the neighboring parts of the groove flank of at least one tread groove, the rubber composition essentially filling up the space between the base of the tread groove and the radially outer ply of the belt reinforcement.

Furthermore, the present invention concerns a rubber composition, which in a new and unused vehicle tire, does not contact a road surface, and which has a thermal conductivity (heat conductivity) at least 5% higher than the thermal conductivity of the rubber composition of the tread in contact therewith.

The present invention further relates to a rubber composition being arranged in the area of at least one shoulder of the tire. The rubber composition is connected at least partially with the belt reinforcement that is located beneath the tire tread, and does not come into contact with a road surface and extends in the axial direction, possibly up to the axial outside limit of the tire body, with the thermal conductivity of the rubber composition being at least 5% higher than the thermal conductivity of the one or more rubber compositions in contact therewith.

In accordance with the present invention, the heat flow between the outside surface of the tire and the belt reinforcement is increased by a rubber composition having improved thermal conductivity. The thermal energy being generated during tire use in the area of the belt reinforcement is quickly removed via the belt reinforcement and via the more thermoconductive rubber composition into outside areas where heat may be released into the ambient air. In this way, very high temperatures in the belt area may be prevented and the danger of heat damage or separation phenomena of the belt may be diminished. The rubber compositions of the reinforcement plies (stabilizer belts and tire plies) are generally designed to be more highly thermoconductive than the surrounding rubber compositions and to be very thin so that the heat being generated may be carried off more quickly through these layers. In the manufacturing process, a thin cushion rubber may be used to improve assembly adhesiveness and may be located between the radially outer stabilizer belt or tire ply and the tread composition, which may contain the more thermoconductive rubber composition in the vicinity of the tread groove. The more thermoconductive rubber composition of the present invention will not adversely affect the desired handling characteristics and tire properties such as wet skid resistance, dry skid resistance, rolling resistance, and wear, because the more thermoconductive composition is arranged such that the major part of the tread, and above all the part coming into direct contact with the road surface, retains its rubber composition that has been optimized in terms of the handling characteristics.

At the same time, the use of the more thermoconductive rubber composition of the present invention offers advantages in the vulcanization process because the composition also causes a rapid heat introduction into relatively thick areas of the tire so that the tire is vulcanized more uniformly and more quickly, without overcuring the thinner components. Overcuring is disadvantageous because it results in an increase in rolling resistance.

By arranging the more thermoconductive rubber composition in the area of at least one shoulder of the tire, the more thermoconductive rubber composition is located in the direct vicinity of the location of the greatest heat build-up in the belt area, namely the belt edges, and from there the heat may be removed effectively to the outside areas of the tire. With this arrangement, the more thermoconductive rubber composition beneath the tread may both extend to the outside limit of the tire body, i.e., be in direct contact with the ambient air, and only occupy a partial area up to the outside wall of the tire. A protective layer of a conventional sidewall composition may be placed over the more thermoconductive composition. If the more thermoconductive composition is located in the area of the tire according to the present invention, due the lower mechanical stress, compromises are more likely to be acceptable with respect to the properties of the material. Uniformly high requirements need not be placed on material properties like those that are absolutely necessary for tread compositions (e.g., regarding hardness and tear propagation resistance) and sidewall compositions (e.g., regarding tear propagation resistance, heat build-up, and ozone resistance). The more thermoconductive composition may be integrated, for example via a composition strip, into the conventional tire building process. In addition, this arrangement offers the advantage that the more thermoconductive composition is almost completely retained in retreading, wherein only the tread has to be abraded, thus ensuring distinctly improved heat dissipation in a retreaded tire.

An especially effective heat dissipation of the belt area may be obtained if the more thermoconductive composition is arranged extending axially outwards both in the direct vicinity of the tread groove base and the neighboring parts of the groove flanks of at least one tread groove as well as in the area of at least one shoulder of the tire.

In accordance with the present invention, it is preferred for the tread groove to be a circumferential groove wherein the more thermoconductive composition is arranged at least in the direct vicinity of the tread groove base and the neighboring parts of the groove flanks. This embodiment is advantageous since it is simple to manufacture and may be integrated well into the process of tire building, e.g., by extrusion or by applying rubber strips to the belt. In addition, it is also especially advantageous for heat dissipation if the above-mentioned circumferential grooves are the grooves nearest to the shoulders of the tire, since the heat build-up is particularly great in the area of the shoulder, i.e., in the area of the edges of the belt, and the problem of belt edge separation may be taken care of effectively especially there.

In order to design the thermal conduction as efficiently as possible and to utilize the thermal conductivity bridge as well as possible, the more thermoconductive composition may be arranged in the vicinity of the tread groove, i.e, the rubber composition with increased thermal conductivity may extend over 5% to 95% of the overall depth of the tread groove in the case of a new tire, starting from the tread groove base. The more thermoconductive rubber composition includes the tread groove base and the radially lower part of the flanks of the tread grooves or indentations. In this way, a sufficiently large heat exchange surface with the ambient air is obtained.

According to another embodiment of the present invention, the distance between the base of the tread groove and the radially outer stabilizer belt or tire ply (basic distance) is about 2 to about 6 mm. Thus, the basic distance lies in a range whose lower limit is thin enough to ensure good heat dissipation and whose upper limit is thick enough both to adequately protect the belt from injury and to make the regroovability of the tread groove possible, which regroovability is desirable in commercial tires.

In another embodiment of the present invention, the more thermoconductive rubber composition, which may be in the vicinity of the tread grooves and/or in the area of the shoulders of the tires, may advantageously have a thermal conductivity that is approximately about 5 to about 80%, particularly about 10 to about 40%, and most preferred about 20% higher than the thermal conductivity of a rubber composition in contact therewith. The effectiveness of the thermal conductivity bridge may be increased in this manner.

Furthermore, the more thermoconductive rubber composition may also have a greater hardness than the hardness of a rubber composition in contact therewith. Arranging the more thermoconductive composition in the vicinity of the base and the flanks of tread grooves results in several additional positive effects. The harder composition, which may extend into the groove flanks according to the present invention, provides support to the surrounding tread composition in the tread pads, thus improving wear behavior and, in particular, preventing irregular wear. Furthermore, the arrangement according to the present invention of a harder composition in the groove flanks results in improved lateral traction in handling.

To increase the thermal conductivity of a rubber composition, carbon black and other substances may be used as filler. The other substances are primarily metals such as aluminum, magnesium, copper, zinc, nickel, and the like, and mixtures thereof and metal-containing substances such as, e.g., zinc oxide, aluminum hydroxide, aluminum oxide, silicon aluminum oxides, magnesium oxide, chromium oxide, titanium oxide, aluminum nitride and titanium carbide, as well as boron nitride, boron carbide, silicon carbide, and the like, and mixtures thereof. These fillers may be used in the form of spherical particles, flakes, needles or the like. When flakes or needles are used, they may optionally be aligned in specific preferred directions. Some of these fillers may impart a color to the rubber composition, which color is different from the typical black of conventional tire compositions so that the functionality of the more thermoconductive areas of the tire may be made visible even to the outside world, e.g., the customer.

It is possible to prepare a rubber composition with higher thermal conductivity by adding more carbon black (advantageously at least approximately 10 parts by weight per hundred parts of rubber in the mixture (phr) more) as filler to the rubber composition than the surrounding rubber composition or a rubber composition in contact therewith, respectively, or by increasing the proportion of zinc oxide by more than 5 phr as compared with the surrounding rubber composition or a rubber composition in contact therewith, respectively. Increasing the carbon black proportion shortens the vulcanization time of the composition and increases the hardness of the vulcanized composition. Increasing the zinc oxide proportion improves the reversion resistance of the rubber composition, in addition to increasing the hardness thereof. Increasing the carbon black proportion in the rubber composition of the tread groove base is advantageous since it offers great protection from groove damage; stones or other hard and sharp-edged objects find it hard to pass through this rubber composition and the possibility of the belt being exposed in places and beginning to corrode is reduced. Due to the relatively good protection from damage in the case of the composition containing carbon black, it is also possible to design wider tread grooves and thus continue to increase the effective surface for heat exchange.

Since the more thermoconductive rubber composition is exposed to high temperatures and fluctuations in temperature, an anti-aging agent with good heat protection properties may be added to the rubber composition. Examples of anti-aging agents are 6PPD (N-phenyl-N'-(1, 3-dimethylbutyl)-p-phenylenediamine) and DTPD (N,N'-ditoluyl-p-phenylenediamine).

The more thermoconductive rubber composition may be arranged in the area of at least one shoulder of the tire. The more thermoconductive rubber composition may be connected at least partially with the belt reinforcement that is located beneath the tread, and does not come into contact with a road surface and extends in the axial direction, optionally up to the axial outside limit of the tire body. Consequently, the tire surface dissipates the heat from locations with high heat build-up with the tire surface (the surface for heat exchange) being increased in the corresponding areas in which the more thermoconductive rubber compositions extend in the axial direction. This heat exchange may be accomplished, for example, by a wave-like design of the areas, with the peaks and the valleys of the waves preferably alternating in the radial direction, which would be tantamount to the effect of cooling ribs. The surface may also be increased, for example, by arranging alternating ribs and grooves running radially in the circumferential direction.

The present invention relates to a vehicle tire having sidewalls, an uppermost area over the sidewalls, a bead area and an inner layer, the inner layer being impermeable to air. The vehicle tire also has a rubberized reinforcement-containing carcass, the carcass extending from the uppermost area of the vehicle tire over the sidewalls into the bead area and being anchored in the bead area by looping around bead cores that are resistant to extension, and a rubber tread having one or more tread grooves located on the radial outside of the tire, the tread groove having a base and a groove flank. The vehicle tire also has a belt reinforcement with at least one stabilizer belt located between the rubber tread and the carcass, the stabilizer belt containing rubberized reinforcement, and a first rubber composition having a first thermal conductivity, the first rubber composition being in contact with at least a part of a second rubber composition, the second rubber composition having a second thermal conductivity at least about 5% greater than the first thermal conductivity of the first rubber composition, the second rubber composition being arranged in the vicinity of the base of the tread groove and adjacent the groove flank of at least one tread groove, the second rubber composition substantially filling up a space between the base of the tread groove and an outside ply of the belt reinforcement, the second rubber composition not being in contact with a road surface when the tire is new.

The second rubber composition may be arranged at least substantially in the direct vicinity of the tread groove base and the neighboring parts of the groove flanks of at least one tread groove, the tread groove in whose vicinity the second conductive rubber composition is arranged preferably being a circumferential groove. The second rubber composition may further be arranged in the vicinity of the two circumferential grooves closest to a shoulder of the tire.

The second rubber composition may extend radially to the outside over 5% to 95% of the overall depth of the tread groove, starting from the tread groove base. The distance between the base of the tread groove and the radially outer stabilizer belt may suitably be about 2 to about 6 mm.

The second rubber composition may have a thermal conductivity that is higher by about 5 to about 80%, particularly about 10 to about 40% and most preferred about 20% than the thermal conductivity of the first rubber composition and may have a greater hardness than the hardness of the first rubber composition.

The second rubber composition may contain one or more fillers selected from carbon black, boron nitride, boron carbide, silicon carbide, metals and metal-containing substances. The metal-containing substances may be selected from one or more of zinc oxide, aluminum hydroxide, aluminum oxide, silicon aluminum oxides, magnesium oxide, chromium oxide, titanium oxide, aluminum nitride, titanium carbide, and mixtures thereof.

The second rubber composition may contain more carbon black as filler than the first rubber composition. The second rubber composition may further contain at least 5 phr more zinc oxide than the first rubber composition. The second rubber composition may also contain an anti-aging agent having good heat-protection properties.

The present invention also relates to a vehicle tire having sidewalls, an uppermost area over the sidewalls, a bead area and an inner layer, the inner layer being impermeable to air. The vehicle tire also has a rubberized, reinforcement-containing carcass, the carcass extending from the uppermost area of the vehicle tire over the sidewalls into the bead area and being anchored in the bead area by looping around bead cores that are resistant to extension, and a rubber tread having one or more tread grooves located on the radial outside of the tire. The tire also has a belt reinforcement with at least one stabilizer belt located between the rubber tread and the carcass, the stabilizer belt containing rubberized reinforcement, and a first rubber composition having a first thermal conductivity, the first rubber composition being in contact with at least a part of a second rubber composition, and the second rubber composition having a second thermal conductivity at least about 5% greater than the first thermal conductivity of the first rubber composition, the second rubber composition being arranged in the area of at least one shoulder of the tire and being connected at least partially with the belt reinforcement that is located beneath the tread, the second rubber composition not coming into contact with a road surface and extending in the axial direction.

The second rubber composition may extend up to the axially outer limit of the tire body. Also, the axial outside surface of the tire body may be increased in the area wherein the second rubber composition extends in the axial direction.

The second rubber composition may have a thermal conductivity that is higher by about 5 to about 80%, particularly about 10 to about 40% and most preferred about 20% than the thermal conductivity of the first rubber composition and may have a greater hardness than the hardness of the first rubber composition.

The second rubber composition may contain one or more fillers selected from carbon black, boron nitride, boron carbide, silicon carbide, metals and metal-containing substances and the metal-containing substances may be selected from one or more of zinc oxide, aluminum hydroxide, aluminum oxide, silicon aluminum oxides, magnesium oxide, chromium oxide, titanium oxide, aluminum nitride, and titanium carbide.

The second rubber composition may contain more carbon black as filler than the first rubber composition or may contain at least 5 phr more zinc oxide than the first rubber composition. The second rubber composition may contain an anti-aging agent having good heat-protection properties. The axial outside surface of the tire body may be increased in the area wherein the second rubber composition extends in the axial direction.

The above vehicle tires may be used for commercial vehicles, particularly trucks.

The present invention also relates to a method for dissipating heat from a vehicle tire, wherein the vehicle tire comprises:

sidewalls, an uppermost area over the sidewalls, a bead area and an inner layer, the inner layer being impermeable to air, a rubberized reinforcement-containing carcass, the carcass extending from the uppermost area of the vehicle tire over the sidewalls into the bead area and being anchored in the bead area by looping around bead cores that are resistant to extension, a rubber tread having one or more tread grooves located radially outside, the tread groove having a base and a groove flank, and a belt reinforcement with at least one stabilizer belt located between the rubber tread and the carcass, the stabilizer belt containing rubberized reinforcement, the vehicle tire including a first rubber composition having a first thermal conductivity, the first rubber composition being in contact with at least a part of a second rubber composition, the second rubber composition having a second thermal conductivity at least about 5% greater than the first thermal conductivity of the first rubber composition, the method comprising:

arranging the first rubber composition in the vicinity of the base of the tread groove and adjacent the groove flank of at least one tread groove, substantially filling the second rubber composition up in the space between the base of the tread groove and an outside ply of the belt reinforcement, such that the second rubber composition is not in contact with a road surface when the tire is new.

The method may also comprise arranging the second rubber composition at least substantially in the direct vicinity of the tread groove base and the neighboring parts of the groove flanks of at least one tread groove, wherein the tread groove in whose vicinity the second conductive rubber composition is arranged preferably is a circumferential groove.

The method may also comprise extending the second rubber composition radially to the outside over 5% to 95% of the overall depth of the tread groove, starting from the tread groove base.

Suitably the distance between the base of the tread groove and the radially outer stabilizer belt may be about 2 to about 6 mm.

The present invention furthermore relates to a method for dissipating heat from a vehicle tire, wherein the vehicle tire comprises:

sidewalls, an uppermost area over the sidewalls, a bead area and an inner layer, the inner layer being impermeable to air, a rubberized reinforcement-containing carcass, the carcass extending from the uppermost area of the vehicle tire over the sidewalls into the bead area and being anchored in the bead area by looping around bead cores that are resistant to extension, a rubber tread having one or more tread grooves located on the radial outside of the tire, a belt reinforcement with at least one stabilizer belt located between the rubber tread and the carcass, the stabilizer belt containing rubberized reinforcement, the vehicle tire including a first rubber composition having a first thermal conductivity, the first rubber composition being in contact with at least a part of a second rubber composition, and the second rubber composition having a second thermal conductivity at least about 5% greater than the first thermal conductivity of the first rubber composition, the method comprising:

arranging the second rubber composition in the area of at least one shoulder of the tire and connecting the second rubber composition at least partially with the belt reinforcement that is located beneath the tread, such that the second rubber composition is not in contact with a road surface when the tire is new and extends in the axial direction.

The method may also comprise extending the second rubber composition up to the axially outer limit of the tire body. Moreover, the axial outside surface of the tire body may be increased in the area wherein the second rubber composition extends in the axial direction.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
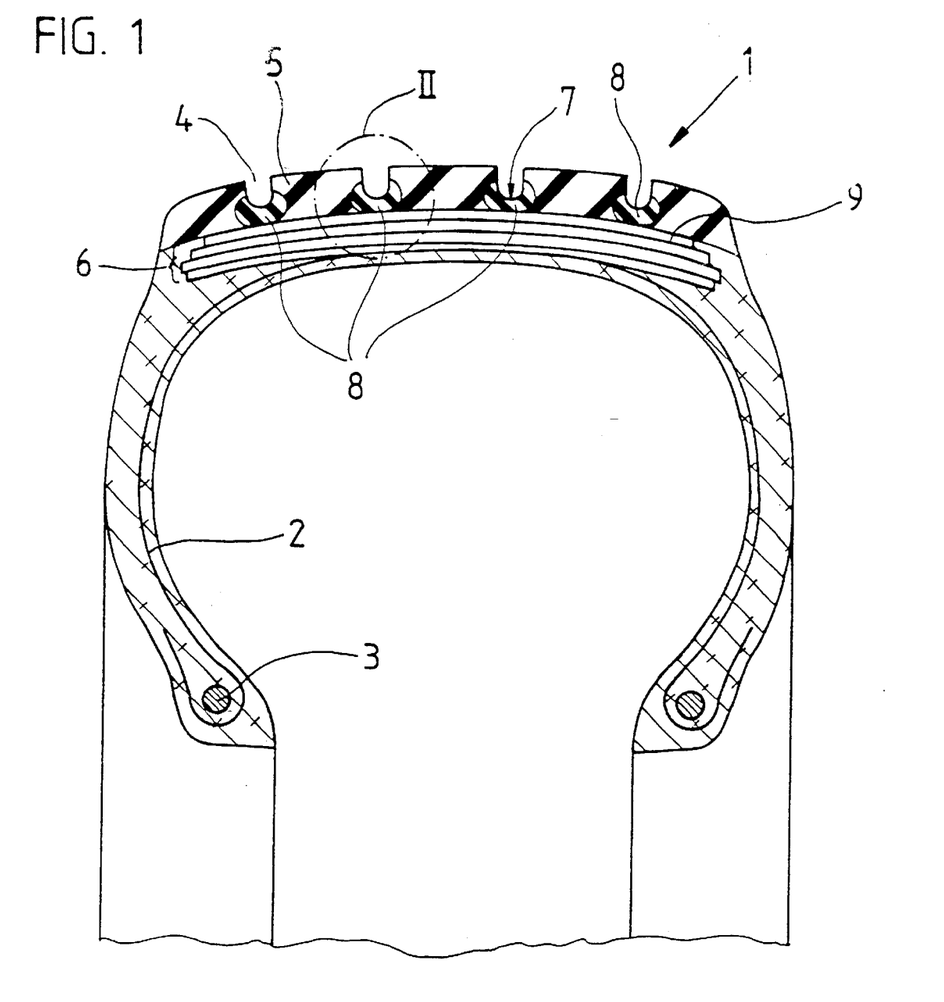
FIG. 1 shows a radial partial section of a vehicle tire.

FIG. 1 shows vehicle tire 1, which has a typical structure for commercial vehicle tires and which has an inner layer that is impermeable to air and rubberized reinforcement-containing carcass 2. The carcass extends from the uppermost area of the vehicle tire 1 over the sidewalls into the bead area and is anchored there by looping around bead cores 3 that are resistant to extension. The vehicle tire includes tread 5 having tread grooves 4 located radially outside, (i.e., on the radial outside portion of the tire) and belt construction 6 made of four plies composed of rubberized metallic reinforcement. Rubber composition 8, whose thermal conductivity is at least 5% higher than that of the rubber composition of tread 5 surrounding it, is located at base 7 of tread grooves 4, and rubber composition 8 is in contact with radially outer stabilizer belt 9. This ensures good heat dissipation. Heat generated in the belt is dissipated to base 7 of tread grooves 4 and, therefore, to the ambient air, thereby preventing strong overheating, which may cause a loosening or separation of the belt, in the belt area. Tread grooves 4 shown in the figure are longitudinal grooves, which offer the advantage of simple manufacturability according to one aspect of the present invention. The tread grooves closest to the shoulder may also be provided with thermoconductive rubber composition 8 since the thermal energy occurring there, caused by flexing work, is especially high and needs to be dissipated.

Figure 2:
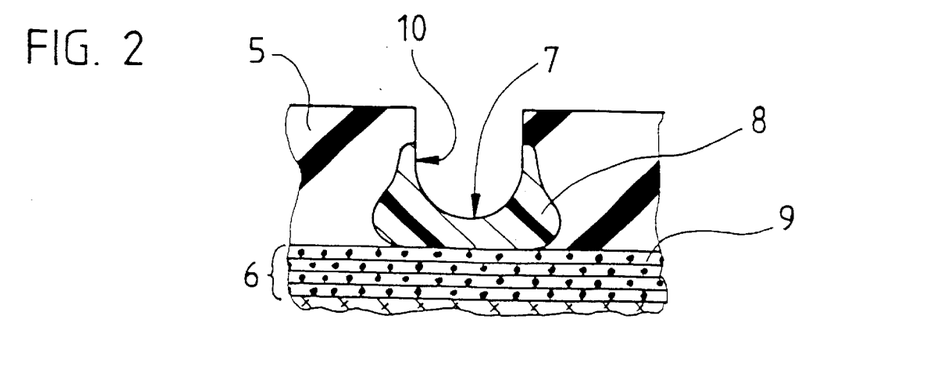
FIG. 2 shows an enlargement of a section of a tread groove with the belt lying beneath the groove from a radial partial section of a vehicle tire.

FIG. 2 shows an enlarged section of tread groove 4 of tread 5 and the surrounding area. The more thermoconductive rubber composition 8 is essentially located in the direct vicinity of tread groove base 7 and the neighboring parts of groove flanks 10 and essentially fills up the space between tread groove base 7 and radially outer stabilizer belt 9. The distance between tread groove base 7 and radially outer stabilizer belt 9 may be from about 2 to about 6 mm. The properties of that part of tread 5 that comes into contact with the road surface are hardly affected by the rubber composition of the tread and good dissipation of the heat is effected by the thermal conductivity bridge between radially outer stabilizer belt 9 and tread groove base 7. Because the composition with the higher thermal conductivity may extend over 5 to 95% of the overall depth of tread grooves 4, it is possible to increase the effective exchange surface with the ambient air. The arrangement of the more thermoconductive rubber composition 8 by extending it into groove flanks 10, as depicted in FIG. 2, and at the same time increasing the hardness of rubber composition 8 produces tread pads which offer advantages in terms of wear and handling (lateral traction). Increasing the proportion of carbon black in rubber composition 8, according to the present invention, results in the positive effect of protecting the belt from groove damage.

Figure 3:
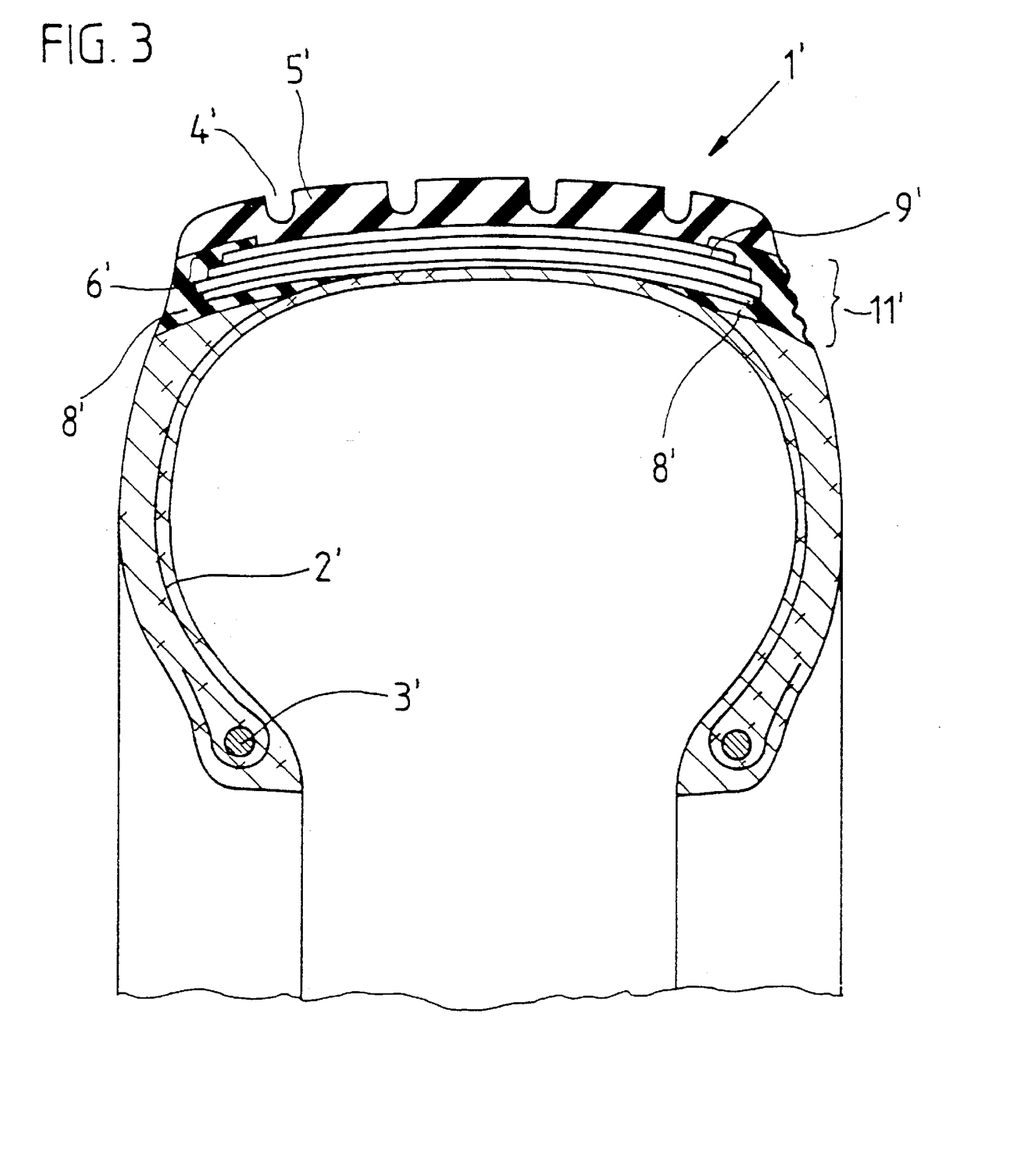
FIG. 3 shows a radial partial section of a vehicle tire.

FIG. 3 shows vehicle tire 1' having the typical structure described in FIG. 1. In vehicle tire 1', the more thermoconductive rubber composition 8' is located beneath tread 5' in the area of the shoulder of the tire. Rubber composition 8' is in contact with the axially outer ends of belt construction 6', which is made of four plies of rubberized, metallic reinforcement, and extends up to the axial outside limit of the tire body. In the embodiment depicted in FIG. 3, heat may be dissipated from the belt edges in the lateral area to the outside wall of the tire and be released there to the ambient air. FIG. 3 also shows on one side of the tire that the axial outside surface of the tire body in area 11', in which the more thermoconductive rubber composition 8' is located, is increased relative to a smooth surface by the formation of waves which act as cooling ribs, thereby increasing the effective heat exchanging surface. As can be seen in FIG. 3, the second rubber composition can be partially radially positioned outside the at least one stabilizer belt and does not come into contact with a road surface and extends in the axial direction. Moreover, as can be seen in FIG. 3, the second rubber composition can completely surround each end of the at least one stabilizer belt and not come into contact with a road surface and extends in the axial direction.

EXAMPLES

Exemplary embodiments are illustrated in further detail below in conjunction with the following tables.

Tables 1 and 2 list several examples of the more thermoconductive rubber compositions 8 and 8', according to the present invention, which compositions are present in the area between tread groove base 7 and radially outer stabilizer belt 9 (see FIG. 1) and present in the areas of the shoulders of the tire (see FIG. 3). The rubber compositions according to the present invention given in Table 1 are especially suited for the area between tread groove base 7 and radially outer stabilizer belt 9. However, all the compositions listed in Tables 1 and 2 may be used for all areas of the tire where improved heat dissipation is desired. Base compositions, which are typically used in treads especially for commercial vehicles, have been included in the tables for comparison purposes. In all indicated compositions, the proportions of the individual composition components refer to parts (by weight) per hundred of rubber (phr) in the mixture.

The various compositions are vulcanized at 150° C. and the vulcanization process is monitored using a rotorless curemeter (MDR=moving disc rheometer) according to DIN 53 529. This is used to determine the vulcanization times until the relative vulcanization degrees of 10 and 90% ($t_{10}$, $t_{90}$) are obtained for all compositions (Tables 1 and 2) and also to determine both the vulcanization times until the relative vulcanization degree 100% ($t_{100}$) is achieved and the times to obtain 2 and 5% reversion ($tr_{98}$, $tr_{95}$) for the compositions in Table 1.

Test specimens are made from the compositions in a press at 150° C. with 25-minute vulcanization and the essential properties of the material of the specimens are determined. The material properties that are determined according to the measuring methods are listed in Table 1.

The ultimate tensile strength is measured at room temperature according to DIN 53 504.

The tensile modulus 300% is measured at room temperature according to DIN 53 504.

The shore hardness (ShA) is measured at room temperature according to DIN 53 505.

The rebound elasticity is measured at room temperature according to DIN 53 512.

The thermal conductivity is measured with the Kemtherm QTM-D3-PD3 device made by Kyoto Electronics according to DIN 52 612 (initial temperature=room temperature).

Natural rubber is used as the rubber component in all the composition examples. Any of the polymers and polymer blends known to one skilled in the art of manufacturing vehicle tires may also be used instead of natural rubber. This may include one or more rubbers from the group of diene rubbers, such as polybutadiene. To obtain greater hardness, it is advantageous to use a rubber or a rubber blend with good fatigue resistance for the composition according to the present invention in order to reduce the risk of fatigue fractures. Such a rubber or a rubber blend may include polybutadiene and special solution-polymerized or emulsion-polymerized styrene-butadiene rubbers. Common additives, such as stearic acid, wax, anti-aging agents, sulfur, and accelerators, may be added as additional constituents to all the sample compositions listed. The amount of accelerator in the Table 1 compositions are 0.8 phr and are 0.5 phr in the Table 2 compositions. The other composition constituents, type N121 and N339 carbon black classified according to ASTM-D 1765, zinc oxide, aluminum oxide (BET surface: 150 $m^2$/g), aluminum hydroxide (BET surface: 25 $m^2$/g, e.g., Martinal® from Martinswerke GmbH, Germany), and aromatic oils are used in the listed compositions in different quantities. Naturally, the compositions may also contain other additives for rubber compositions known to one skilled in the art. Such additives include silica and silane coupling agents. Particularly when using metal-containing fillers it may be advantageous to use agents which enhance the interaction between the filler surface and the rubber. Such agents include functionalized silanes.

Table 1, below, compares the Base Composition with the Invention Compositions (Examples 1 to 4). Table 2, below, compares the Base Composition with the Invention Compositions (Examples 5 to 9).

TABLE 1

|  | Unit | Base Composition | Example 1 (Invention) | Example 2 (Invention) | Example 3 (Invention) | Example 4 (Invention) |
| --- | --- | --- | --- | --- | --- | --- |
| Composition |  |  |  |  |  |  |
| Natural rubber | phr | 100 | 100 | 100 | 100 | 100 |
| Carbon black N121 | phr | 46 | 46 | 46 | 50 | 50 |
| Carbon black N339 | phr | — | — | — | 15 | 15 |
| Zinc oxide | phr | 3 | 11.5 | 20 | 3 | 20 |
| Stearic acid | phr | 2 | 2 | 2 | 2 | 2 |
| Wax | phr | 1 | 1 | 1 | 1 | 1 |
| Aromatic oils | phr | — | — | — | 5 | 5 |
| Anti-aging agent | phr | 2.5 | 2.5 | 2.5 | 2.5 | 2.5 |
| Accelerator | phr | 0.8 | 0.8 | 0.8 | 0.8 | 0.8 |
| Sulfur | phr | 1.5 | 1.5 | 1.5 | 1.5 | 1.5 |
| Vulcanization |  |  |  |  |  |  |
| $t_{10}$ | min. | 3.1 | 3.5 | 3.4 | 2.6 | 2.8 |
| $t_{90}$ | min. | 8.3 | 9.0 | 9.0 | 7.7 | 8.1 |
| $t_{100}$ | min. | 13.9 | 15.6 | 16.2 | 13.1 | 13.7 |
| $tr_{98}$ | min. | 20.8 | 22.5 | 22.7 | 18.3 | 19.6 |
| $tr_{95}$ | min. | 28.3 | 30.8 | 31.0 | 24.3 | 26.2 |
| Material properties |  |  |  |  |  |  |
| Ultimate tensile strength at RT | N/$mm^2$ | 25.7 | 25.2 | 24.8 | 22.9 | 20.5 |
| Tensile modulus 300% at RT | N/$mm^2$ | 15.45 | 14.89 | 15.48 | 19.11 | 19.75 |
| Shore hardness at RT | ShA | 65.0 | 65.7 | 66.8 | 71.3 | 72.2 |

TABLE 1-continued

|  | Unit | Base Composition | Example 1 (Invention) | Example 2 (Invention) | Example 3 (Invention) | Example 4 (Invention) |
|---|---|---|---|---|---|---|
| Rebound elasticity at RT | % | 48.6 | 48.0 | 48.0 | 37.9 | 37.7 |
| Thermal conductivity | W/m*K | 0.2772 | 0.2920 | 0.3079 | 0.3126 | 0.3395 |

TABLE 2

|  | Unit | Base Composition | Example 5 (Invention) | Example 6 (Invention) | Example 7 (Invention) | Example 8 (Invention) | Example 9 (Invention) |
|---|---|---|---|---|---|---|---|
| Composition |  |  |  |  |  |  |  |
| Natural rubber | phr | 100 | 100 | 100 | 100 | 100 | 100 |
| Carbon black N121 | phr | 46 | 46 | 46 | 46 | 50 | 50 |
| Aluminum oxide | phr | — | 20 | 40 | 80 | — | — |
| Aluminum hydroxide | phr | — | — | — | — | 10 | 30 |
| Zinc oxide | phr | 3 | 3 | 3 | 3 | 3 | 3 |
| Stearic acid | phr | 2 | 2 | 2 | 2 | 2 | 2 |
| Wax | phr | 1 | 1 | 1 | 1 | 1 | 1 |
| Aromatic oils | phr | — | 2.5 | 5 | 10 | 1.25 | 3.75 |
| Anti-aging agent | phr | 2.5 | 2.5 | 2.5 | 2.5 | 2.5 | 2.5 |
| Accelerator | phr | 0.5 | 0.5 | 0.5 | 0.5 | 0.5 | 0.5 |
| Sulfur | phr | 1.5 | 1.5 | 1.5 | 1.5 | 1.5 | 1.5 |
| Vulcanization |  |  |  |  |  |  |  |
| $t_{10}$ | min. | 3.1 | 0.8 | 0.6 | 0.4 | 3.2 | 3.1 |
| $t_{90}$ | min. | 8.4 | 4.7 | 3.1 | 2.2 | 8.8 | 9.0 |
| Material properties |  |  |  |  |  |  |  |
| Ultimate tensile strength at RT | N/mm² | 22.4 | 14.0 | 13.7 | 12.2 | 22.6 | 18.9 |
| Tensile modulus 300% at RT | N/mm² | 11.58 | 7.79 | 10.20 | 10.22 | 10.67 | 9.94 |
| Shore hardness at RT | ShA | 58.8 | 53.2 | 57.3 | 63.0 | 57.5 | 57.6 |
| Rebound elasticity at RT | % | 47.3 | 45.3 | 46.2 | 38.2 | 48.0 | 45.0 |
| Thermal conductivity | W/m*K | 0.2752 | 0.3011 | 0.3181 | 0.3627 | 0.2973 | 0.3384 |

Tables 1 and 2 show that the vulcanized products from the compositions according to the present invention have a thermal conductivity which is at least 5% higher than the thermal conductivity of the Base Composition.

Table 1 shows that the Invention Compositions exhibit an increasing higher thermal conductivity as compared with the Base Composition as the proportion of more thermoconductive constituents of their compositions, i.e., carbon black and/or zinc oxide, is increased. In order to obtain distinctly noticeable effects in thermal conductivity, the proportion of carbon black in the more thermoconductive rubber composition (element 8 of FIG. 1 and element 8' of FIG. 3) is preferably increased by at least about 10 phr, as compared with the surrounding rubber composition (element 5 of FIG. 1 and element 5' of FIG. 3). Likewise, in order to obtain distinctly noticeable effects in thermal conductivity, the proportion of zinc oxide in the more thermoconductive rubber composition (element 8 of FIG. 1 and element 8' of FIG. 3) is preferably increased by at least about 5 phr, as compared with the surrounding rubber composition (element 5 of FIG. 1 and element 5' of FIG. 3). If higher amounts of carbon black are used in the more thermoconductive rubber composition as compared with the surrounding rubber composition, process oils (aromatic oils) may optionally be added for better processability.

Examples 3 and 4 in Table 1 show that the increase in the proportion of carbon black results in an advantageous reduction in the vulcanization time, i.e., $t_{10}$ to $t_{100}$. On the other hand, Examples 1 and 2 show that an increased proportion of zinc oxide retards the partial network breakdown (reversion), i.e., $tr_{98}$ and $tr_{95}$. Depending upon the desired vulcanization behavior, the skilled worker may select an appropriate composition.

Table 1 shows that the material properties of the vulcanized products that were fabricated from the compositions according to the present invention have a higher Shore hardness than the vulcanization products from the Base Composition. Thus, it is possible to obtain improved wear and lateral traction by the increased stability of the tread pads when using the composition according to the present invention in the areas of the tread groove flanks.

Table 2 shows that higher thermal conductivity is obtained in the sample compositions by adding aluminum oxide or aluminum hydroxide to the rubber composition.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS 1,1' vehicle tire (radial partial section)
2,2' rubberized carcass
3,3' bead core
4,4' tread groove
5,5' rubber tread
6,6' belt reinforcement made of plies of rubberized, metallic reinforcement
7 tread groove base
8,8' more thermoconductive rubber composition
9,9' radially outer stabilizer belt
10 groove flank
11' area of increased surface of the tire body

What is claimed is:

1. A vehicle tire comprising:
sidewalls, an uppermost area over the sidewalls, a bead area and an inner layer, the inner layer being impermeable to air,
a rubberized, reinforcement-containing carcass, the carcass extending from the uppermost area of the vehicle tire over the sidewalls into the bead area and being anchored in the bead area by looping around bead cores that are resistant to extension,
a rubber tread having one or more tread grooves located on the radial outside of the tire,
a belt reinforcement with at least one stabilizer belt located between the rubber tread and the carcass, the stabilizer belt containing rubberized reinforcement,
a first rubber composition having a first thermal conductivity, the first rubber composition being in contact with at least a part of a second rubber composition, and
the second rubber composition having a second thermal conductivity at least about 5% greater than the first thermal conductivity of the first rubber composition, the second rubber composition being arranged in the area of at least one shoulder of the tire and being connected at least partially with the belt reinforcement that is located beneath the tread, the second rubber composition being partially radially positioned outside the at least one stabilizer belt and not coming into contact with a road surface and extending in the axial direction.

2. The vehicle tire, according to claim 1, wherein the second rubber composition extends up to the axially outer limit of the tire.

3. The vehicle tire, according to claim 1, wherein the axial outside surface of the tire is increased relative to a smooth surface.

4. The vehicle tire, according to claim 1, wherein the second rubber composition has a thermal conductivity that is higher by about 5% to about 80% than the thermal conductivity of the first rubber composition.

5. The vehicle tire, according to claim 4, wherein the second rubber composition has a thermal conductivity that is higher by about 10% to about 40% than the thermal conductivity of the first rubber composition.

6. The vehicle tire, according to claim 5, wherein the second rubber composition has a thermal conductivity that is higher by about 20% than the thermal conductivity of the first rubber composition.

7. The vehicle tire, according to claim 1, wherein the second rubber composition has a greater hardness than the hardness of the first rubber composition.

8. The vehicle tire, according to claim 1, wherein the second rubber composition contains one or more fillers selected from carbon black, metals, metal-containing substances, boron nitride, boron carbide, silicon carbide, and mixtures thereof.

9. The vehicle tire, according to claim 8, wherein the metal-containing substances are selected from zinc oxide, aluminum hydroxide, aluminum oxide, silicon aluminum oxides, magnesium oxide, chromium oxide, titanium oxide, aluminum nitride, titanium carbide, and mixtures thereof.

10. The vehicle tire, according to claim 1, wherein the second rubber composition contains more carbon black as filler than the first rubber composition.

11. The vehicle tire, according to claim 1, wherein the second rubber composition contains at least 5 phr more zinc oxide than the first rubber composition.

12. The vehicle tire, according to claim 1, wherein the second rubber composition contains anti-aging agent having good heat-protection properties.

13. The vehicle tire, according to claim 1, wherein the second rubber composition is in contact with one or more additional rubber compositions.

14. The vehicle tire, according to claim 1, wherein the vehicle tire is a commercial tire.

15. The vehicle tire, according to claim 14, wherein the vehicle tire is a truck tire.

16. A vehicle tire, according to claim 1, wherein the second rubber composition extends up to the axially outer limit of the tire, wherein the axial outside surface of the tire body is increased relative to a smooth surface, wherein the second rubber composition has a thermal conductivity that is higher by about 10% to about 40% than the thermal conductivity of the first rubber composition, and wherein the second rubber composition has a greater hardness than the hardness of the first rubber composition.

17. A method for dissipating heat from a vehicle tire, wherein the vehicle tire comprises:
sidewalls, an uppermost area over the sidewalls, a bead area and an inner layer, the inner layer being impermeable to air,
a rubberized, reinforcement-containing carcass, the carcass extending from the uppermost area of the vehicle tire over the sidewalls into the bead area and being anchored in the bead area by looping around bead cores that are resistant to extension,
a rubber tread having one or more tread grooves located on the radial outside of the tire,
a belt reinforcement with at least one stabilizer belt located between the rubber tread and the carcass, the stabilizer belt containing rubberized reinforcement, the vehicle tire including a first rubber composition having a first thermal conductivity, the first rubber composition being in contact with at least a part of a second rubber composition, and the second rubber composition having a second thermal conductivity at least about 5% greater than the first thermal conductivity of the first rubber composition, the method comprising:

arranging the second rubber composition in the area of at least one shoulder of the tire and connecting the second rubber composition at least partially with the belt reinforcement that is located beneath the tread, such that the second rubber composition is partially radially positioned outside the at least one stabilizer belt and is not in contact with a road surface when the tire is new and extends in the axial direction.

18. The method, according to claim 17, wherein the second rubber composition is extended up to the axially outer limit of the tire.

19. The method, according to claim 17, wherein the axial outside surface of the tire is increased relative to a smooth surface.

20. The method, according to claim 17, wherein the second rubber composition has a thermal conductivity that is higher by about 5% to about 80% than the thermal conductivity of the first rubber composition.

21. The method, according to claim 20, wherein the second rubber composition has a thermal conductivity that is higher by about 10% to about 40% than the thermal conductivity of the first rubber composition.

22. The method, according to claim 21, wherein the second rubber composition has a thermal conductivity that is higher by about 20% than the thermal conductivity of the first rubber composition.

23. The method, according to claim 17, wherein the second rubber composition has a greater hardness than the hardness of the first rubber composition.

24. The method, according to claim 17, wherein the second rubber composition contains one or more fillers selected from carbon black, metals, metal-containing substances, boron nitride, boron carbide, silicon carbide, and mixtures thereof.

25. The method, according to claim 24, wherein the metal-containing substances are selected from zinc oxide, aluminum hydroxide, aluminum oxide, silicon aluminum oxides, magnesium oxide, chromium oxide, titanium oxide, aluminum nitride, titanium carbide, and mixtures thereof.

26. The method, according to claim 17, wherein the second rubber composition contains more carbon black as filler than the first rubber composition.

27. The method, according to claim 17, wherein the second rubber composition contains at least 5 phr more zinc oxide than the first rubber composition.

28. The method, according to claim 17, wherein the second rubber composition contains anti-aging agent having good heat-protection properties.

29. The method, according to claim 17, wherein the vehicle tire is a commercial tire.

30. The vehicle tire, according to claim 1, wherein the second rubber composition completely surrounds each end of the at least one stabilizer belt.

31. The method, according to claim 17, wherein the second rubber composition completely surrounds each end of the at least one stabilizer belt.

32. The vehicle tire, according to claim 3, wherein the increase in the axial outside surface of the tire comprises waves.

33. The method, according to claim 19, wherein the increase in the axial outside surface of the tire comprises waves.

34. A vehicle tire comprising:

sidewalls, an uppermost area over the sidewalls, a bead area and an inner layer, the inner layer being impermeable to air, a rubberized, reinforcement-containing carcass, the carcass extending from the uppermost area of the vehicle tire over the sidewalls into the bead area and being anchored in the bead area by looping around bead cores that are resistant to extension, a rubber tread having one or more tread grooves located on the radial outside of the tire, a belt reinforcement with at least one stabilizer belt located between the rubber tread and the carcass, the stabilizer belt containing rubberized reinforcement, a first rubber composition having a first thermal conductivity, the first rubber composition being in contact with at least a part of a second rubber composition, and the second rubber composition having a second thermal conductivity at least about 5% greater than the first thermal conductivity of the first rubber composition, the second rubber composition being arranged in the area of at least one shoulder of the tire and being connected at least partially with the belt reinforcement that is located beneath the tread, the second rubber composition completely surrounding each end of the at least one stabilizer belt and not coming into contact with a road surface and extending in the axial direction.

35. The vehicle tire, according to claim 34, wherein the second rubber composition extends up to the axially outer limit of the tire.

36. The vehicle tire, according to claim 34, wherein the axial outside surface of the tire is increased relative to a smooth surface.

37. The vehicle tire, according to claim 36, wherein the increase in the axial outside surface of the tire comprises waves.

38. The vehicle tire, according to claim 34, wherein the second rubber composition has a thermal conductivity that is higher by about 5% to about 80% than the thermal conductivity of the first rubber composition.

39. The vehicle tire, according to claim 38, wherein the second rubber composition has a thermal conductivity that is higher by about 10% to about 40% than the thermal conductivity of the first rubber composition.

40. The vehicle tire, according to claim 39, wherein the second rubber composition has a thermal conductivity that is higher by about 20% than the thermal conductivity of the first rubber composition.

41. The vehicle tire, according to claim 34, wherein the second rubber composition has a greater hardness than the hardness of the first rubber composition.

42. The vehicle tire, according to claim 34, wherein the second rubber composition contains one or more fillers selected from carbon black, metals, metal-containing substances, boron nitride, boron carbide, silicon carbide, and mixtures thereof.

43. The vehicle tire, according to claim 42, wherein the metal-containing substances are selected from zinc oxide, aluminum hydroxide, aluminum oxide, silicon aluminum oxides, magnesium oxide, chromium oxide, titanium oxide, aluminum nitride, titanium carbide, and mixtures thereof.

44. The vehicle tire, according to claim 34, wherein the second rubber composition contains more carbon black as filler than the first rubber composition.

45. The vehicle tire, according to claim 34, wherein the second rubber composition contains at least 5 phr more zinc oxide than the first rubber composition.

46. The vehicle tire, according to claim 34, wherein the second rubber composition contains anti-aging agent having good heat-protection properties.

47. The vehicle tire, according to claim 34, wherein the second rubber composition is in contact with one or more additional rubber compositions.

48. The vehicle tire, according to claim 34, wherein the vehicle tire is a commercial tire.

49. The vehicle tire, according to claim 48, wherein the vehicle tire is a truck tire.

50. The vehicle tire, according to claim 34, wherein the second rubber composition extends up to the axially outer limit of the tire, wherein the axial outside surface of the tire body is increased relative to a smooth surface, wherein the second rubber composition has a thermal conductivity that is higher by about 10% to about 40% than the thermal conductivity of the first rubber composition, and wherein the second rubber composition has a greater hardness than the hardness of the first rubber composition.

51. A method for dissipating heat from a vehicle tire, wherein the vehicle tire comprises:
   sidewalls, an uppermost area over the sidewalls, a bead area and an inner layer, the inner layer being impermeable to air,
   a rubberized, reinforcement-containing carcass, the carcass extending from the uppermost area of the vehicle tire over the sidewalls into the bead area and being anchored in the bead area by looping around bead cores that are resistant to extension,
   a rubber tread having one or more tread grooves located on the radial outside of the tire,
   a belt reinforcement with at least one stabilizer belt located between the rubber tread and the carcass, the stabilizer belt containing rubberized reinforcement, the vehicle tire including a first rubber composition having a first thermal conductivity, the first rubber composition being in contact with at least a part of a second rubber composition, and the second rubber composition having a second thermal conductivity at least about 5% greater than the first thermal conductivity of the first rubber composition, the method comprising:
     arranging the second rubber composition in the area of at least one shoulder of the tire and connecting the second rubber composition at least partially with the belt reinforcement that is located beneath the tread, such that the second rubber composition completely surrounds each end of the at least one stabilizer belt and is not in contact with a road surface when the tire is new and extends in the axial direction.

52. The method, according to claim 51, wherein the second rubber composition is extended up to the axially outer limit of the tire.

53. The method, according to claim 51, wherein the axial outside surface of the tire is increased relative to a smooth surface.

54. The method, according to claim 51, wherein the second rubber composition has a thermal conductivity that is higher by about 5% to about 80% than the thermal conductivity of the first rubber composition.

55. The method, according to claim 54, wherein the second rubber composition has a thermal conductivity that is higher by about 10% to about 40% than the thermal conductivity of the first rubber composition.

56. The method, according to claim 55, wherein the second rubber composition has a thermal conductivity that is higher by about 20% than the thermal conductivity of the first rubber composition.

57. The method, according to claim 51, wherein the second rubber composition has a greater hardness than the hardness of the first rubber composition.

58. The method, according to claim 51, wherein the second rubber composition contains one or more fillers selected from carbon black, metals, metal-containing substances, boron nitride, boron carbide, silicon carbide, and mixtures thereof.

59. The method, according to claim 58, wherein the metal-containing substances are selected from zinc oxide, aluminum hydroxide, aluminum oxide, silicon aluminum oxides, magnesium oxide, chromium oxide, titanium oxide, aluminum nitride, titanium carbide, and mixtures thereof.

60. The method, according to claim 51, wherein the second rubber composition contains more carbon black as filler than the first rubber composition.

61. The method, according to claim 51, wherein the second rubber composition contains at least 5 phr more zinc oxide than the first rubber composition.

62. The method, according to claim 51, wherein the second rubber composition contains anti-aging agent having good heat-protection properties.

63. The method, according to claim 51, wherein the vehicle tire is a commercial tire.

64. The vehicle tire, according to claim 1, wherein the at least one stabilizer belt comprises at least three plies.

65. The vehicle tire according to claim 1, wherein the at least one stabilizer belt comprises four plies.

66. The method, according to claim 17, wherein the at least one stabilizer belt comprises at least three plies.

67. The method, according to claim 17, wherein the at least one stabilizer belt comprises four plies.

68. The vehicle tire, according to claim 34, wherein the at least one stabilizer belt comprises at least three plies.

69. The vehicle tire according to claim 34, wherein the at least one stabilizer belt comprises four plies.

70. The method, according to claim 51, wherein the at least one stabilizer belt comprises at least three plies.

71. The method, according to claim 51, wherein the at least one stabilizer belt comprises four plies.

* * * * *